(12) United States Patent
Loncke et al.

(10) Patent No.: US 11,008,762 B2
(45) Date of Patent: May 18, 2021

(54) FLOOR PANEL AND METHOD FOR MANUFACTURING FLOOR PANELS

(71) Applicant: UNILIN, BV, Wielsbeke (BE)

(72) Inventors: Frank Loncke, Knesselare (BE); Luc Vanhastel, Tielt (BE); Laurent Meersseman, Mont de l' Enclus (BE)

(73) Assignee: UNILIN BV, Wielsbeke (BE)

( * ) Notice: Subject to any disclaimer, the term of this patent is extended or adjusted under 35 U.S.C. 154(b) by 0 days.

(21) Appl. No.: 16/593,534

(22) Filed: Oct. 4, 2019

(65) Prior Publication Data

US 2020/0040589 A1    Feb. 6, 2020

Related U.S. Application Data

(63) Continuation of application No. 15/741,001, filed as application No. PCT/IB2016/053717 on Jun. 22, 2016, now Pat. No. 10,472,833.

(30) Foreign Application Priority Data

Jul. 2, 2015   (BE) .................................. 2015/5419

(51) Int. Cl.
*E04B 2/00*   (2006.01)
*E04F 15/02*   (2006.01)
(Continued)

(52) U.S. Cl.
CPC .......... *E04F 15/02038* (2013.01); *B32B 3/02* (2013.01); *B32B 3/06* (2013.01);
(Continued)

(58) Field of Classification Search
CPC ......... B44C 5/0476; B44C 5/043; B27N 7/00; B32B 21/08; B32B 27/304; B32B 3/06;
(Continued)

(56) References Cited

U.S. PATENT DOCUMENTS

| 5,755,068 A | 5/1998 | Ormiston |
| 6,769,219 B2 | 8/2004 | Schwitte et al. |

(Continued)

FOREIGN PATENT DOCUMENTS

| BE | 1019453 A3 | 7/2012 |
| CN | 104309229 A | 1/2015 |

(Continued)

OTHER PUBLICATIONS

Belgian Search Report from BE Application No. BE 201505419, dated Oct. 14, 2016.

(Continued)

*Primary Examiner* — Basil S Katcheves
(74) *Attorney, Agent, or Firm* — Workman Nydegger

(57) ABSTRACT

A floor panel has a substrate and a decorative layer of wood veneer provided thereon having a thickness of 1 millimeter or less. The substrate has an average density of more than 750 kilograms per cubic meter. The floor panel is rectangular and oblong and comprises a pair of opposite short edges and a pair of opposite long edges. The floor panel, on at least said two opposite long edges, is provided with coupling means allowing that two of such floor panels can be coupled to each other in a vertical direction perpendicular to the plane of the coupled panels and in a horizontal direction in this plane and perpendicular to the respective edge. The wood veneer and/or the substrate immediately underneath the wood veneer is treated at least at the short edges with a fluoro copolymer or a polymeric methylene diphenyl diisocyanate.

27 Claims, 4 Drawing Sheets

(51) Int. Cl.
 B32B 21/02 (2006.01)
 B32B 21/14 (2006.01)
 E04F 15/04 (2006.01)
 B32B 29/00 (2006.01)
 B32B 21/06 (2006.01)
 B32B 27/42 (2006.01)
 B32B 3/26 (2006.01)
 B32B 27/10 (2006.01)
 B32B 3/02 (2006.01)
 B32B 7/12 (2006.01)
 B32B 21/08 (2006.01)
 B32B 37/10 (2006.01)
 B32B 3/06 (2006.01)

(52) U.S. Cl.
 CPC ............... *B32B 3/263* (2013.01); *B32B 7/12* (2013.01); *B32B 21/02* (2013.01); *B32B 21/06* (2013.01); *B32B 21/08* (2013.01); *B32B 21/14* (2013.01); *B32B 27/10* (2013.01); *B32B 27/42* (2013.01); *B32B 29/002* (2013.01); *B32B 37/10* (2013.01); *E04F 15/02033* (2013.01); *E04F 15/042* (2013.01); *E04F 15/045* (2013.01); *B32B 2255/08* (2013.01); *B32B 2255/26* (2013.01); *B32B 2260/026* (2013.01); *B32B 2260/028* (2013.01); *B32B 2260/046* (2013.01); *B32B 2264/102* (2013.01); *B32B 2307/412* (2013.01); *B32B 2307/414* (2013.01); *B32B 2307/72* (2013.01); *B32B 2307/732* (2013.01); *B32B 2317/16* (2013.01); *B32B 2419/04* (2013.01); *B32B 2451/00* (2013.01); *B32B 2471/00* (2013.01); *B32B 2607/00* (2013.01); *E04F 2201/0146* (2013.01); *E04F 2201/0153* (2013.01); *E04F 2201/0161* (2013.01); *E04F 2201/023* (2013.01); *E04F 2201/043* (2013.01); *E04F 2201/0535* (2013.01); *E04F 2201/0552* (2013.01)

(58) Field of Classification Search
 CPC .... B32B 21/02; B32B 21/14; E04F 15/02038; E04F 13/0894; E04F 15/02033; E04F 15/02; E04F 2201/0535; E04F 2201/0588; E04F 2201/0107; E04F 2201/0523; E04F 2201/0146; E04F 2201/0176; E04F 2201/0153; E04F 2201/0138; E04F 2201/0123; E04F 2201/049; E04F 15/045; Y10T 428/17; Y10T 428/195; Y10T 428/24488
 USPC .................. 52/313, 390, 588.1, 589.1, 592.1
 See application file for complete search history.

(56) References Cited

U.S. PATENT DOCUMENTS

| 6,880,307 | B2 | 4/2005 | Schwitte et al. |
| 7,597,947 | B2 | 10/2009 | Schuster |
| 2002/0170258 | A1 | 11/2002 | Schwitte et al. |
| 2003/0037504 | A1 | 2/2003 | Schwitte et al. |
| 2004/0019145 | A1* | 1/2004 | Imoto ................. C08G 18/706 524/502 |
| 2005/0136234 | A1 | 6/2005 | Hak et al. |
| 2006/0070325 | A1 | 4/2006 | Magnusson |
| 2007/0196676 | A1 | 8/2007 | Schuster |
| 2009/0133353 | A1 | 5/2009 | Pervan et al. |
| 2009/0155612 | A1 | 6/2009 | Pervan et al. |
| 2010/0313511 | A1 | 12/2010 | Thiers |
| 2012/0266555 | A1 | 10/2012 | Cappelle |
| 2013/0104485 | A1* | 5/2013 | Meersseman ............ B32B 3/06 52/578 |
| 2014/0000197 | A1 | 1/2014 | Pervan |
| 2015/0197943 | A1* | 7/2015 | Ziegler .................. B32B 21/14 428/161 |
| 2016/0201336 | A1 | 7/2016 | Pervan |
| 2016/0348379 | A1 | 12/2016 | Liu |
| 2016/0375674 | A1 | 12/2016 | Schulte |
| 2017/0120564 | A1 | 5/2017 | Schulte |
| 2017/0321416 | A1 | 11/2017 | Clausi et al. |
| 2018/0080232 | A1 | 6/2018 | Pervan |
| 2018/0155934 | A1* | 6/2018 | D'Hondt .......... E04F 15/02038 |

FOREIGN PATENT DOCUMENTS

| DE | 10245914 A1 | 4/2004 |
| DE | 102007043202 A1 | 3/2009 |
| DE | 202013012020 U1 | 2/2015 |
| EP | 1761370 B1 | 12/2008 |
| EP | 2013034 A2 | 1/2009 |
| EP | 2065183 A1 | 6/2009 |
| EP | 2415947 A2 | 2/2012 |
| EP | 2805778 A1 | 11/2014 |
| EP | 2902196 A1 | 8/2015 |
| EP | 3100857 A1 | 12/2016 |
| GB | 785008 A | 10/1957 |
| JP | S53148506 A | 12/1978 |
| JP | H02188206 A | 7/1990 |
| JP | H1086107 A | 4/1998 |
| KR | 100768517 B1 | 10/2007 |
| KR | 20090006503 A | 1/2009 |
| KR | 20120070704 A | 7/2012 |
| WO | 9747834 A1 | 12/1997 |
| WO | 0151732 A1 | 7/2001 |
| WO | 0175247 A1 | 10/2001 |
| WO | 03087498 A1 | 10/2003 |
| WO | 2004050359 A1 | 6/2004 |
| WO | 2007149051 A1 | 12/2007 |
| WO | 2009065769 A2 | 5/2009 |
| WO | 2009124704 A1 | 10/2009 |
| WO | 2010122514 A2 | 10/2010 |
| WO | 2011152787 A1 | 12/2011 |
| WO | 2012004699 A2 | 1/2012 |
| WO | 2015078434 A1 | 6/2015 |
| WO | 2015078443 A1 | 6/2015 |
| WO | 2015078444 A1 | 6/2015 |
| WO | 2015105456 A1 | 7/2015 |
| WO | 2015174909 A1 | 11/2015 |
| WO | 2017009744 A1 | 1/2017 |
| WO | 2017188883 A1 | 11/2017 |

OTHER PUBLICATIONS

International Search Report from PCT Application No. PCT/IB2016/053717, dated Sep. 14, 2016.

* cited by examiner

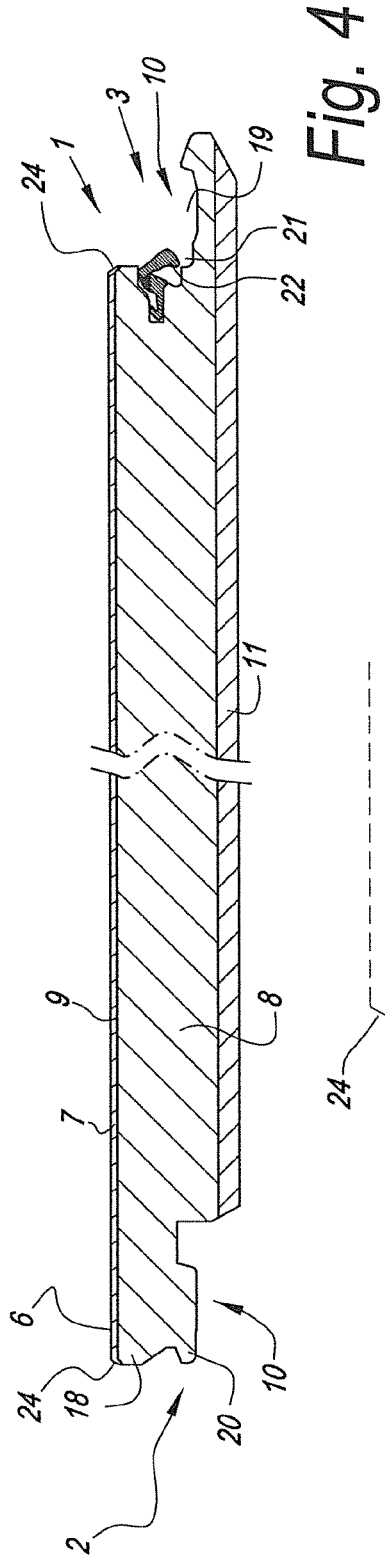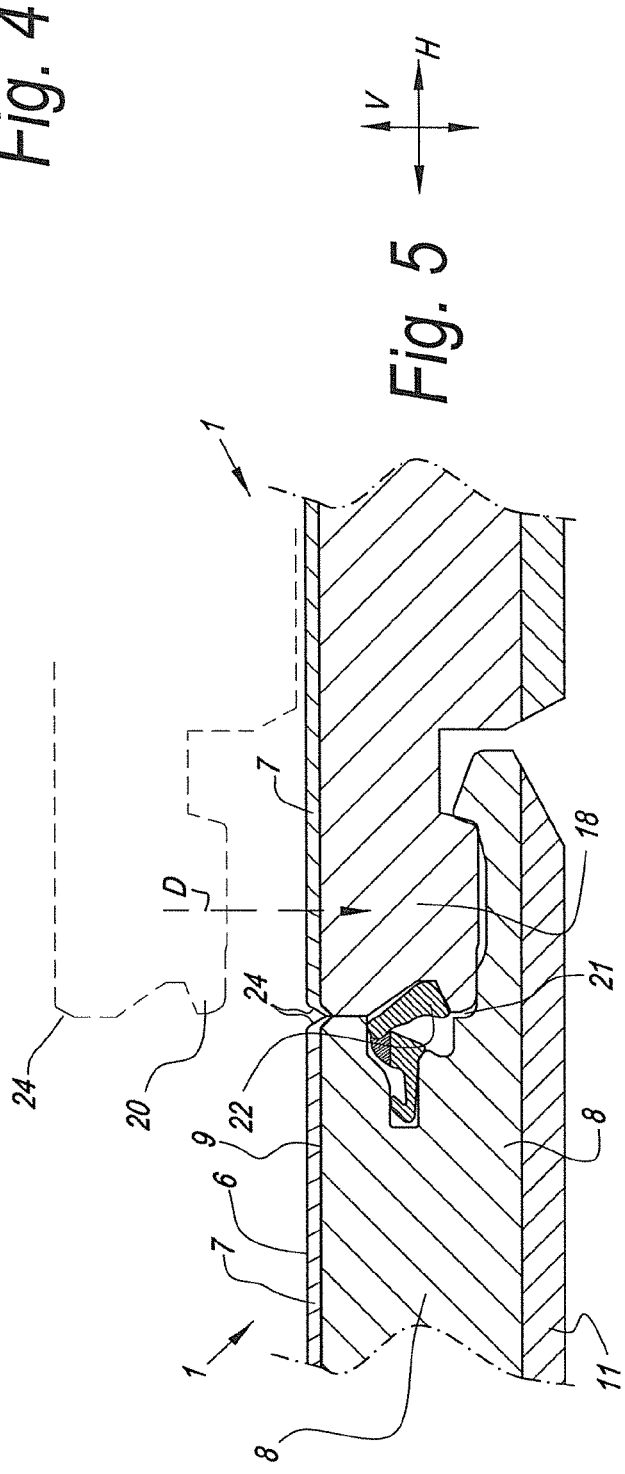

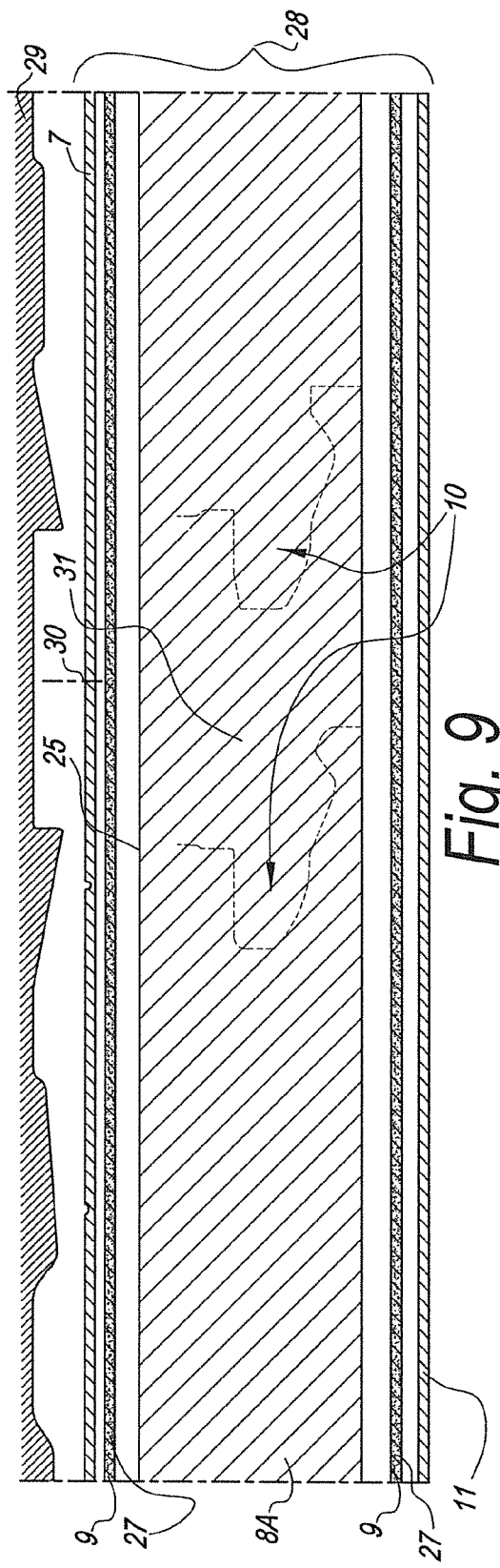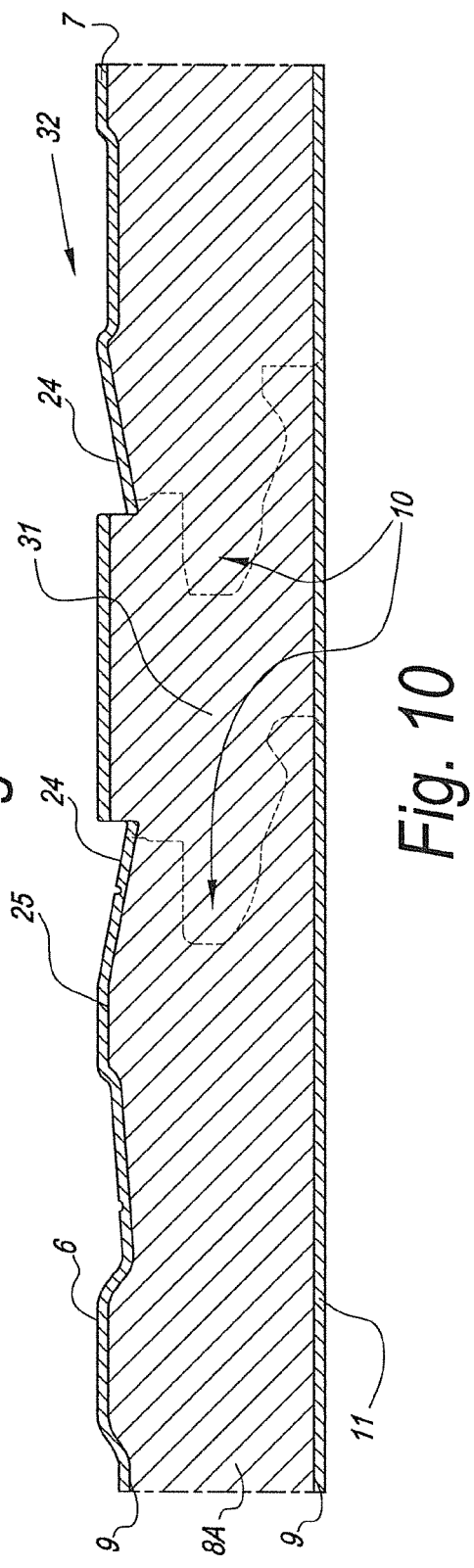

FLOOR PANEL AND METHOD FOR MANUFACTURING FLOOR PANELS

BACKGROUND OF THE INVENTION

1. Field of the Invention

This invention relates to a floor panel, as well as to a method for manufacturing floor panels.

More particularly, the invention relates to decorative panels, such as floor panels, which comprise a top layer or decorative layer on the basis of wood. Such panels are widely known as such, for example, from WO 2010/122514. In the case of floor panels, this means parquet which is ready for installation, pre-fabricated parquet or composed parquet, in English also indicated as "Engineered Wood Parquet", or veneer parquet. The present invention aims in particular to floor panels for veneer parquet, namely floor panels with a wooden top layer having a thickness of 1 millimeter or less.

Floor panels for veneer parquets are described, for example, in U.S. Pat. No. 5,755,068 and usually comprise at least a substrate and a wood veneer of at less than 2 millimeters glued thereon. According to the EN 13489 standard, panels with a wooden top layer of 2.5 millimeters and more may be called multi-layered parquet or "multilayer parquet" and are not considered a veneer parquet. In panels for veneer parquet, a wood-based backing layer may also be glued to the underside of the substrate. The wood layer situated on the upper side works as a top and decorative layer and mostly is made of hardwood. However, on its upper side it still can be treated further, for example, for exerting an influence on the appearance thereof and/or for improving the surface quality thereof, for example, by means of coloring, of applying a wear-resistant and water-proof transparent lacquer, and so on. The wood-based backing layer mostly consists of a one-piece thin layer of a cheap and mostly soft wood species. Such veneer parquet panels are sensitive to impressions by impact and may be susceptible to scratches. Due to their insufficient mechanical properties, soft wood species are unusable as a top layer for such panels. On the narrow edges of the veneer there is a risk of penetration of humidity, and ring-shaped spots may show on the veneer surface.

2. Related Art

From DE 102 45 914, it is known, for the top layer of veneer parquet, to glue a wood veneer impregnated with thermosetting resin onto a MDF or HDF substrate, print it and finish it with a wear-resistant resin. For the resin, use is made of phenol resin or melamine resin. In such floor panels, there is a risk that the veneer layer delaminates from the substrate; moreover, this method is complicated.

US 2006/070,325 and US 2005/136,234 describe a method wherein a wooden top layer of 2 millimeters or more is glued, under pressure, onto a MDF/HDF substrate, wherein a certain impregnation of the applied glue in the wooden top layer is obtained.

DE 20 2013 012 020 U1 and WO 2015/078434 describe a method wherein a wooden veneer layer having a thickness between 0.6 mm and 1.2 mm is pressed, via an intermediate resin layer, onto a MDF/HDF substrate in a hot press. The intermediate resin layer may comprise a thermosetting resin. Such product composition may be susceptible to impact.

SUMMARY OF THE DISCLOSURE

The present invention primarily aims at an alternative panel for veneer parquet, wherein according to various preferred embodiments solutions are offered for the problems with the floor panels of the state of the art.

To this aim, the present invention relates to a floor panel with a substrate and a provided thereon decorative layer of wood veneer having a thickness of 2 millimeters or less, of still better of 1 millimeter or less, with the characteristic that said substrate has an average density of more than 750 kilograms per cubic meter and that said decorative layer is provided on the substrate by means of a layer on the basis of thermosetting resin situated between the substrate and the decorative layer. The combination of a high average density of the substrate and gluing the wood veneer on the basis of a thermosetting resin results in a veneer parquet with high impact resistance. The underlying substrate with high density unabatedly functions as a buffer for impression deformations or perforations exerted on the thin veneer, as the intermediate resin layer forms a relatively hard connection between the veneer and the substrate.

Preferably, said substrate, at least at the surface where the decorative layer is situated, has a density of more than 900 kilograms per cubic meter, or even of more than 1000 or 1100 kilograms per cubic meter. Preferably, this herein relates to a density locally increased at the surface, whereas the core of the substrate has a lower than average density, for example, less than 800 or less than 750 kilograms per cubic meter. The combination of a high surface density with a lower internal density leads to an optimum between impact resistance and sound absorption in the use of a veneer parquet composed of the panels of the invention.

Preferably, the aforementioned substrate is a wood fiberboard, more particularly of the HDF type. Herein, this may relate to an HDF board which is glued by means of urea formaldehyde, melamine formaldehyde or melamine-urea formaldehyde. According to another possibility, this HDF board is glued by means of pMDI. pMDI or polymeric methylene diphenyl diisocyanate has a certain resiliency and in this manner can contribute to the impact resistance of the floor panel.

Preferably, said substrate shows a swelling of less than 15%, as measured according to EN 317:1993.

Preferably, said substrate has a thickness between 5 and 15 millimeters, and still better between 6 and 10 millimeters.

Preferably, said wood veneer has a thickness between 0.3 and 1 millimeter, preferably approximately 0.6 millimeters. It is primarily with these thin veneers that an important gain in impact resistance can be obtained with the combination of a thermosetting resin layer and a substrate of high density.

Preferably, said thermosetting resin relates to a melamine-based resin. Preferably, the thermosetting resin is made antistatic, for example, by means of the remedies known as such for laminate floor panels from WO 2004/050359. So, for example, a solution of an alkali salt may be blended into the thermosetting resin.

Preferably, said wood veneer is at least partially impregnated by means of the aforementioned thermosetting resin. Such impregnation results in a higher density of the veneer and contributes to the impact resistance of the panel.

Preferably, said decorative layer comprises a transparent or translucent surface material on the surface. Such material can form an addition to the wear resistance and/or scratch resistance of the veneer top layer.

According to a first possibility, the transparent or translucent surface material is at least obtained on the basis of a polyurethane-based and/or acrylate-based lacquer, for example a lacquer with at least 25 percent by weight, or still better at least 50 percent by weight, of acrylates chosen from the list consisting of polyurethane acrylates, polyester acrylates and/or epoxide acrylates. Preferably, this relates to a lacquer which is hardened by means of UV radiation, electron beam or excimer radiation. This may relate, for example, to surface material which is applied by means of an inert coating-system. Such systems are known, for example, from EP 2 805 778. Herein, a lacquer is hardened by means of radiation, for example, UV radiation, through a transparent press element, for example, through a transparent press belt or press film.

According to a second possibility, the transparent or translucent surface material is at least obtained on the basis of said thermosetting resin, either in that this resin has penetrated through the veneer layer, or in that a separate resin layer of the same or similar thermosetting resin has been provided on the veneer layer.

According to a third possibility, the first possibility and the second possibility are combined, wherein the surface material formed by the lacquer preferably is situated above the surface material on the basis of the thermosetting resin.

Preferably, a matte surface is obtained with the surface material, namely a surface having a gloss degree of 10 or less, as measured according to DIN 67530. The gloss degree of the surface can be obtained, for example, by means of an excimer-hardened lacquer layer, for example, according to the above-mentioned first possibility. With excimer-hardened lacquer layers, the gloss degree can even be set by means of regulating the energy which is incident on the surface material to be hardened. According to a variant, the gloss degree of the surface can also be obtained by means of an inert coating system, wherein the structure of the applied press element, preferably a press film, determines the gloss degree. Of course, it is also possible to obtain a glossy surface with the surface material, for example, a surface having a gloss degree of 20 or more, as measured according to DIN 67530.

Preferably, the transparent surface material comprises 15 to 30 percent by weight of hard particles, such as particles of corundum (aluminum oxide) and/or silica (silicon oxide). Herein, this may relate to particles having an average particle size of 50 micrometers or smaller, or even of 10 micrometers or smaller, wherein it is not excluded that particles might be used having an average particle size situated between 100 nanometers and 1 micrometer.

The thickness of the surface material preferably is 0.05 millimeters or less.

Preferably, the surface material follows a possible relief present on the surface of the wood veneer, for example, at least possibly present lower edges and preferably also at least a portion of the wood pore structure of the veneer.

Preferably, the surface material extends in a layer shape over at least 80 percent of the surface of the veneer layer, and still better over the entire or approximately the entire surface thereof.

Preferably, said floor panel is provided with lower edge regions on one or more edges, wherein said wood veneer extends in one piece from on the surface of the substrate over said lower edge regions. In that the veneer extends up to a lower-situated region at the edge of the floor panel, an increased wear resistance is obtained at these edges. A direct impact or a direct walking on the edge of the veneer then is improbable, and delamination or other damage to these edges is practically excluded. Moreover, such edge region offers the optical illusion that the panel has a thicker wooden top layer. Preferably, said lower edge region forms a bevel or other chamfer, wherein the wood veneer extends over the lower edge region at least up to a point wherein the veneer surface is situated on a level in a horizontal plane which intersects said substrate.

In the case of an oblong rectangular floor panel, said lower edge regions preferably are provided at least on the opposite long edges and possibly additionally on the opposite short edges, however, not necessarily. The short edges may also be free from lower edge regions.

Preferably, on one or more edges said wood veneer is compressed. This can be obtained, for example, by forming lower edge regions on the edges concerned by means of an impression of the veneer and preferably of underlying layers, such as the substrate, as well. When performing such impression, preferably also said layer of thermosetting resin does harden, such that the springing back of the impressed material may remain restricted. Providing compressed wood veneer on the edges results in an increased resistance against moisture penetration. It is primarily advantageous when at least the narrow edges of the wood veneer are compressed.

Preferably, said thermosetting resin includes wear-resistant particles, such as, for example, aluminum oxide, silicon oxide or silicon carbide particles, preferably having an average particle size situated between 20 and 200 micrometers. These particles penetrate into the wood veneer at the bottom side and provide a barrier against wearing through of the veneer.

Preferably, said layer on the basis of thermosetting resin extends uninterruptedly underneath the entire wood veneer. In the case that the wood veneer extends on lower edge regions of the veneer, the thermosetting resin preferably also extends on these lower edge regions, such that a good adherence of the veneer is obtained and a possible springing back of compressed material is limited.

Preferably, a backing layer is provided on the underside of the substrate, which backing layer also comprises thermosetting resin, for example, a backing layer on the basis of a paper sheet impregnated with resin, or a backing layer on the basis of a wood veneer layer which is attached to the substrate with a thermosetting resin layer. This may relate, for example, to a veneer of fir or pine. A backing layer of wood veneer preferably has a thickness of minimum 1 to 2 millimeters, for example, approximately 1.5 millimeters. Herein, this may relate to a veneer obtained by means of a rotative cutting treatment, or so-called "rotary peeled veneer".

Preferably, the floor panel, on at least two opposite edges, is provided with coupling means allowing that two of such floor panels can be coupled to each other in a vertical direction perpendicular to the plane of the coupled panels and in a horizontal direction in this plane and perpendicular to the respective edge. Such coupling means are known as such, for example, from WO 97/47834. According to an important first possibility thereof, the coupling means on two opposite edges preferably substantially are made as a tongue and a groove with locking parts which prevent the moving out of each other of the tongue and the groove. Such locking parts may consist, for example, of an upwardly protruding locking element on the lower groove lip, wherein this locking element borders a recess in the lower groove lip, and a protrusion, cooperating with this locking element, on the underside of the tongue, wherein this protrusion fits into the aforementioned recess. According to an important second possibility thereof, the coupling means on two opposite edges are made as a male part and a female part, wherein the male part can be provided in the female part by means of a downward movement, wherein the male part and the female part engage into each other, such that a locking in horizontal direction is obtained. Preferably, the male and female parts further also comprise blocking means, whether or not made in one piece, which can come into a position wherein a removal of the male part in vertical direction out of the female part is prevented. Such coupling means are known as such, for example, from WO 01/75247 or WO 01/51732.

In order to obtain maximum water resistance, the substrate and/or the wood veneer preferably is treated on one or more edges with a fluoro copolymer or a pMDI. This treatment preferably relates to a treatment of the narrow edges of the wood veneer and/or at least the substrate material immediately underneath the wood veneer. Such treatment can also be realized partially overlapping with the surface of the wood veneer. This is of particular interest in those cases in which the wood veneer on the respective edge extends over a lower-situated edge region. In those cases any disturbing effect of the overlapping with the surface of the floor panel is less prominent, as it can be limited to a portion of the surface situated in this lower-situated edge region. Preferably, the overlapping is limited to the portion situated immediately at the edge of the floor panel. So, for example, the technique can be applied which, from EP 2 013 034 B 1, is known as such for laminate panels.

According to a second independent aspect, the present invention also relates to a method for manufacturing panels or floor panels, wherein these floor panels comprise at least a substrate and a provided thereon decorative layer of wood veneer, wherein the method comprises at least the following steps:

the step of providing a base plate having an average density of 750 kilograms per cubic meter or more;

the step of composing a stack which comprises at least the structured base plate, a resin layer on the basis of thermosetting resin and one or more wood veneers;

the step of pressing said stack in a heated press, wherein said resin layer is hardened, such that said veneers are adhered to the base plate;

the step of dividing the pressed whole into panels, of which panels said floor panels can be formed;

the step of finishing said panels form to said floor panels. Preferably, said finishing consists at least of providing one or more lacquer layers, for example, UV lacquer layers, or one or more layers of oil, and/or of providing a surface material according to the earlier mentioned first possibility thereof.

The method allows obtaining highly performant floor panels on the basis of a thin wood veneer layer, for example, a wood veneer layer of 0.4 to 1 millimeter.

The aforementioned resin layer can be provided in said stack in different manners. According to a first manner, the resin can be applied at least partially in liquid condition, for example, by means of one or more roller installations and/or spreading installations, after which it is dried to a residual moisture content of preferably less than 10 percent by weight. According to a second manner, the resin can be provided at least partially in powder form, for example, by means of one or more strewing installations. Preferably, this powder resin is fixated somewhat in the stack, for example, by spraying it with a fine water mist. According to a third manner, the resin can be provided at least partially by means of a carrier sheet, such as a paper sheet. Such paper sheet then can be impregnated with resin prior to the step of composing the stack, preferably saturated with resin, and dried to a residual moisture content of preferably less than 10 percent by weight. The impregnated and dried sheet then is included in the stack. According to a fourth manner, the resin can be at least partially provided in the stack in that the wood veneer, prior to the step of composing the stack, has been provided with resin on its underside.

Preferably, the realized floor panel shows a relief on the upper surface. In this manner, with a wood veneer top layer still the impression can be created that a thicker top layer is used. A relief in the upper surface can be achieved according to various methods, from which the two primary ones will be listed herein below.

According to a first possibility, the method further also comprises the step of structuring the upper surface of said base plate, wherein said wood veneers are adhered to the base plate, such that they follow at least partially the contour of the structured upper surface of the base plate. Structuring the upper surface of the base plate may be performed, for example, by means of mechanical machining treatments, such as by one or more of sawing, milling, planing or the like. According to another possibility, the process of structuring the upper surface can be performed by means of a press treatment which deforms the upper surface of the base plate. Preferably, the structuring of the upper surface of the base plate is performed prior to the aforementioned pressing step and, preferably, prior to the step of composing the stack with the layers to be pressed. In other words, in such case the aforementioned wood veneers are adhered to the base plate only after the upper surface of the base plate has been structured already.

According to a second possibility, in said pressing step said base plate is deformed, such that the upper surface of said base plate shows a structure, wherein simultaneously said wood veneers are adhered to the base plate, such that they follow at least partially the contour of the structured upper surface of the base plate.

Preferably, said wood veneers follow the structured upper surface such that the final floor panels are provided with lower edge regions on one or more edges, wherein the wood veneer extends in one piece from on the surface of the substrate over the aforementioned lower edge regions. According to another example, said wood veneers follow the structured upper surface in such a manner that the final floor panels show the relief of a scraped floor panel in their upper surface, namely a relief consisting of lower-situated oblong paths extending substantially in the longitudinal direction of the floor panel.

A method which provides for a structured surface with veneer panels is of interest, independently of the fact whether the decorative top layer or the wood veneer is provided on the substrate by means of thermosetting resin. Therefore, the invention, according to an independent third aspect, also relates to a method for manufacturing floor panels, wherein these floor panels comprise at least a substrate and a provided thereon decorative layer of wood veneer, wherein the method comprises at least the following steps:

the step of providing a base plate having an average density of 750 kilograms per cubic meter or more;

the step of composing a stack comprising at least the base plate, a glue layer or resin layer, and one or more wood veneers;

the step of pressing said stack in a press, wherein said base plate is deformed, such that the upper surface of said base plate shows a structure, and that said wood veneers at least partially follow the contour of the structured upper surface of the base plate;

the step of dividing the pressed whole into panels, of which panels the aforementioned floor panels can be formed;

the step of finishing said panels to form said floor panels.

With such method, the optical illusion of a massive top layer is achieved.

Preferably, the pressing step is performed in a heated press, for example, with a temperature of more than 80° C., and/or at least the upper surface of the base plate has a temperature of more than 60° C. during the pressing step. The inventor has found that a heated base plate, either heated by means of the heated press, or heated by a separate heating, or a combination of the two, leads to a more efficient deformation of the upper surface of the substrate or the base plate. A separate heating can be obtained, for example, by radiation with infrared radiators (IR) or close-up infrared radiators (NIR) prior to the press treatment.

In order to promote the deformation of the base plate, at least the upper surface to be structured can be moistened with water and/or steam.

Preferably, with the method of the third aspect it is obtained that the wood veneers follow the structured upper surface such that the final floor panels, on one or more edges, are provided with lower edge regions, wherein the wood veneer extends in one piece from on the upper surface of the substrate over said lower edge regions. As aforementioned, in this manner an additional resistance against delamination of the decorative top layer is obtained, and an additional resistance against water penetration and the negative effects thereof. Namely, the wood veneer of the decorative layer is compressed on such edge, such that moisture absorption is limited at these edges.

Of course, on the surface of the floor panel also other or possibly additional relief characteristics can be obtained by means of the third aspect. Important examples of such relief characteristics are oblong paths for imitating scraped parquet, indentations and walking marks for imitating antique or aged parquet.

Preferably, the method of the second and/or the third aspect is applied for manufacturing the panels of the first aspect. In the case of the third aspect, however, it is not necessary that a layer of thermosetting resin is located between the substrate and the decorative layer. According to the third aspect, a glue layer may be applied as well, for example, a glue on the basis of polyurethane, hot-melt glue ("hotmelt") or polyvinyl acetate ("PVAc").

Preferably, the thermosetting resin has a residual moisture content of less than 10 percent, for example, of approximately 7 percent. A low residual moisture content is advantageous during pressing and reduces the risk of the occurrence of defects in the decorative top layer. Namely, an excess amount of water may lead to that the veneer layers are affected and/or to the decorative layer puffing open due to a too high steam pressure in the intermediate resin layer.

As aforementioned, said resin layer, according to a particular embodiment, comprises a layer of wear-resistant particles, for example, particles of aluminum oxide, silicon oxide or silicon carbide. The particles preferably have an average particle size situated between 20 and 200 micrometers. Preferably, aluminum oxide is applied. This is very advantageous in combination with a thermosetting resin on the basis of melamine or melamine formaldehyde, in view of the fact that aluminum oxide has a refractive index which is approximately the same as that of the resin. Therefore, the particles, even if they should have an average particle size of more than 80 micrometers, are hardly noticeable.

Preferably, said layer of thermosetting resin comprises coloring means, such as dyes or staining agents (English: dyes or stains), which preferably can penetrate into said veneer layer when the latter is being pressed. According to a variant, the respective veneer layers can be colored prior to the press treatment.

Preferably, for the decorative layer veneer layers are applied which are obtained by sawing massive wood. By sawing, the wood structure is preserved better than in the case of cutting or peeling. For the possible backing layer, preferably cut or peeled veneer is applied, for example, so-called "rotary peeled veneer", preferably with a thickness which is larger than that of the decorative layer. According to a particular independent aspect, the present invention relates to a floor panel with a substrate, a provided thereon decorative layer of wood veneer and a provided thereunderneath backing layer, also of wood veneer, characterized in that the decorative top layer and the backing layer differ from each other in one or more of the following ways, namely that: the decorative top layer is a wood veneer obtained by sawing, whereas the backing layer is a wood veneer obtained by cutting off or peeling, preferably a so-called "rotary peeled veneer"; the wood veneer of the decorative top layer is thinner than the wood veneer of the backing layer; preferably, the wood veneer of the decorative top layer has a thickness of 1 millimeter or less, whereas the wood veneer of the backing layer has a thickness of more than 1 millimeter, for example, a thickness of approximately 1.5 to approximately 2 millimeters.

Surprisingly, the inventor has found that, irrespective of the differences between the top layer and backing layer, still a stable sandwich structure can be achieved.

In combination with the differences of the particular independent aspect mentioned herein above, the decorative layer and the backing layer can also show one or more of the following characteristics:

the wood veneer of the decorative top layer consists of an oak veneer (quercus), maple veneer (acer) or an ash veneer (fraxinus), whereas the wood veneer of the backing layer is chosen from the series of fir veneer (picea) or pine veneer (pinus); the wood veneer of the decorative top layer consists of hardwood, whereas the wood veneer of the backing layer consists of softwood.

According to the present independent aspect, the backing layer can be chosen in order to obtain a good sound insulation in use, whereas the decorative top layer can be chosen in order to render a good wear resistance or impact resistance to the upper surface, while still sufficient stability is obtained for providing panels for a floating floor covering, for example, of the type which, on at least two opposite edges, is provided with mechanical coupling means, which allow that two of such floor panels can be coupled to each other in a vertical direction perpendicular to the plane of the coupled panels and in a horizontal direction in this plane and perpendicular to the respective edge. Preferably, the above-mentioned differences are combined with each other, for example, by applying a decorative layer of sawn veneer of hardwood, for example, oak or ash, having a thickness of less than 1 millimeter, and a backing layer of fir or pine veneer having a thickness of more than 1 millimeter and obtained by rotative cutting ("rotary peel"). It is clear that a floor panel with the characteristics of the above particular independent aspect further may show the features of the earlier mentioned first aspect or the preferred embodiments thereof, as far as they are not contradictory. According to a variant, the decorative layer and/or the backing layer can be glued onto the substrate by means of a glue on the basis of polyurethane, hot-melt glue ("hotmelt") or polyvinyl acetate glue (PVAc). Preferably, such floor panel is provided with lower edge regions on one or more edges, wherein the wood veneer of the decorative layer extends in one piece from on the surface of the substrate over the aforementioned lower edge regions.

The wood veneers which, in the second and/or third aspect of the invention, are included in the stack mentioned there, possibly may be adhered to each other by means of sewing and/or glue connections, such that a veneer layer is obtained, parts of which are present in a plurality of the finally obtained floor panels. Preferably, the obtained floor panels are free from such sewing and/or glue connections, or at least are at least free from such connections which would extend transverse to the longitudinal direction of the panel. Thus, preferably care is taken that such connections, in the pressed whole, are located on substrate material which must be removed during the process of dividing and/or finishing. According to a variant, a plurality of separate wood veneers are included in the stack and positioned next to each other, wherein the joint between adjacent wood veneers is located on substrate material which must be removed.

The finishing step mentioned in the second and/or third aspect of the invention may relate, for example, to applying the already mentioned surface material, for example, according to the first possibility thereof, and/or to forming of coupling means on one or more edges of the floor panels. Preferably, a matte surface is realized by means of the provided transparent or translucent surface material.

BRIEF DESCRIPTION OF THE DRAWINGS

With the intention of better showing the characteristics of the invention, hereafter, as an example without any limitative character, some preferred embodiments are described, with reference to the accompanying drawings, wherein:

FIG. 4, in a view similar to that of FIG. 2, represents a variant;

FIG. 5, at a larger scale, represents the floor panel of FIG. 4 in coupled condition;

FIGS. 9 and 10 illustrate a step in a method with the characteristics of the invention.

DETAILED DESCRIPTION OF VARIOUS EMBODIMENTS

Figure 1:
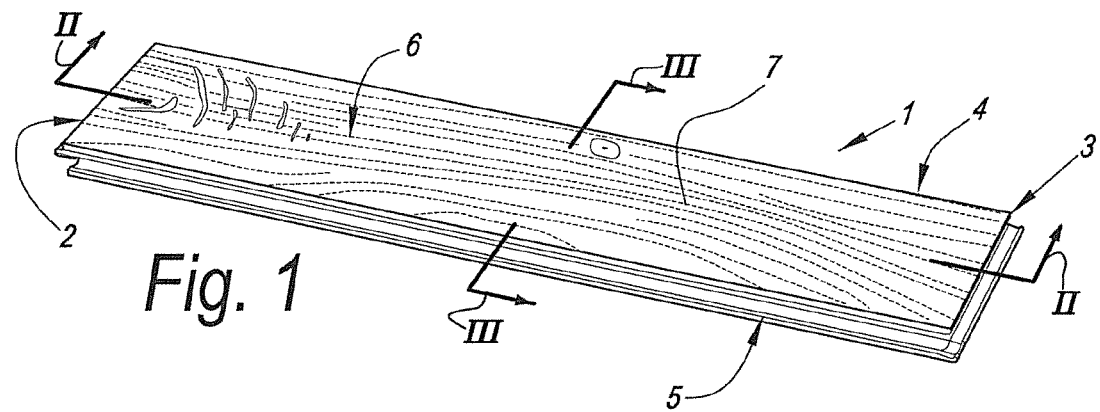
FIG. 1 in perspective represents a floor panel having the characteristics of the invention.

FIG. 1 represents a decorative panel, more particularly a floor panel 1, in accordance with the invention. The panel 1 is rectangular and oblong and comprises a pair of opposite short edges 2-3 and a pair of opposite long edges 4-5. The decorative top layer 6 is formed by a wood veneer 7 having a thickness of 1 millimeter or less; in this case, the veneer has a thickness T1 of approximately 0.6 millimeters.

Figure 2:
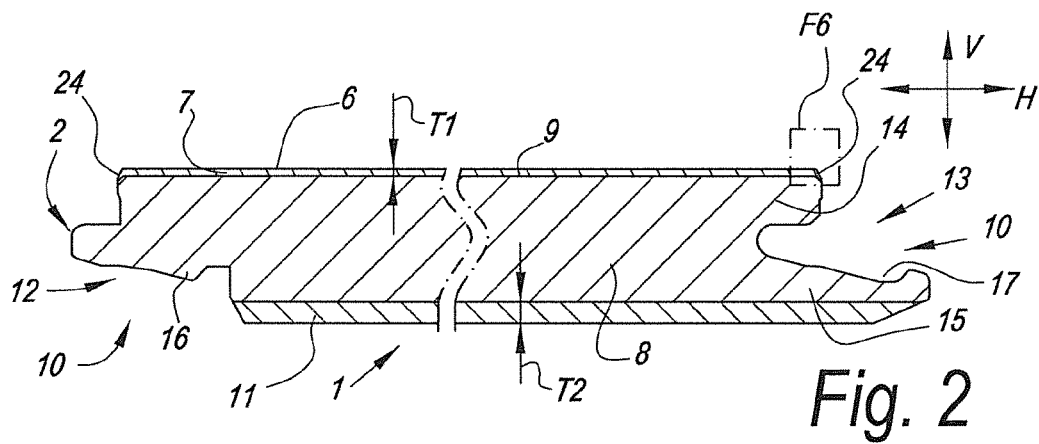
FIGS. 2 and 3, at a larger scale, represent a cross-section according to the lines II-II and III-III, respectively, shown in FIG. 1.

FIG. 2 clearly shows that the decorative panel 1 comprises a substrate material 8 on which the wood veneer 7 is provided by means of a layer on the basis of thermosetting resin 9, which is situated between the substrate and the decorative layer. According to the invention, the substrate material 8 has an average density of more than 750 kilograms per cubic meter. In this case, this relates to a HDF plate material having an average density of 900 kilograms per square meter and a surface density of more than 1000 kilograms per square meter. On the edges 2-3 and 4-5, mechanical coupling means 10 are formed in the substrate material by means of milling. On the bottom side of the substrate material 8, a backing layer 11 is provided, for example, glued or fixed in another manner against the substrate material 8. According to a preferred embodiment of the invention, such backing layer 11 is also attached to the substrate material 8 by means of a layer of thermosetting resin. Such backing layer 11 preferably is made of a wooden veneer layer having a thickness T2 of at least 50 percent of the decorative top layer. Still better, and in accordance with the particular independent aspect mentioned in the introduction, the decorative top layer or the wood veneer 7 and the backing layer 11 differ from each other at least in that the wood veneer of the backing layer 11 is thicker than the wood veneer 7 of the top layer. The backing layer 11 may consist, for example, of a "rotary peeled veneer" having a thickness T2 of 1.5 millimeters or thicker, whereas the wood veneer 7 of the top layer is a veneer having a thickness T1 of less than 1 millimeter. According to a variant, for the backing layer 11 a similar composed veneer 7 can be used as for the top layer.

Figure 3:
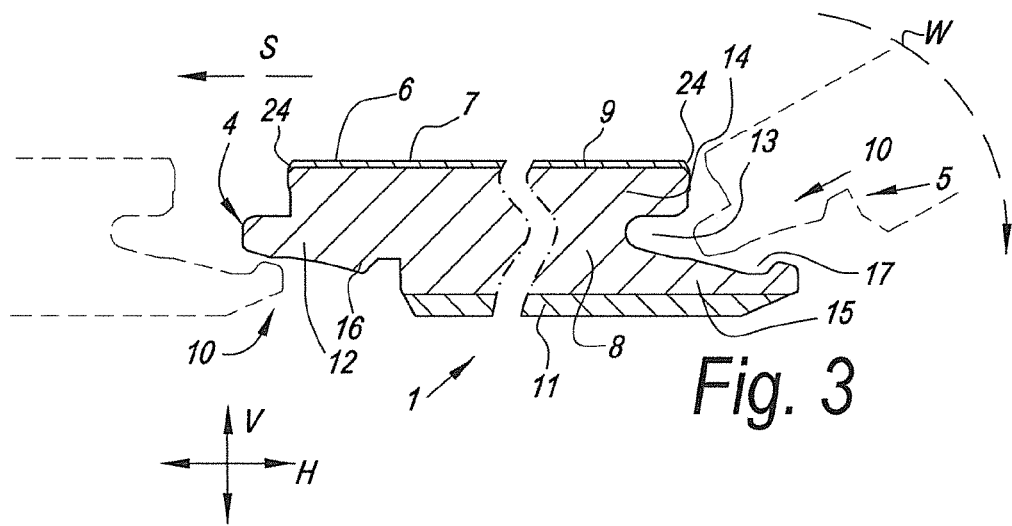

FIGS. 2 and 3 represent that both pairs of opposite edges 2-3-4-5 are provided with mechanical coupling means 10 which substantially are realized as a tongue 12 and a groove 13 bordered by an upper lip 14 and a lower lip 15, wherein the tongue 12 and the groove 12 substantially are responsible for the locking in a vertical direction V, and wherein the tongue 12 and the groove 13 are provided with additional locking parts 16-17, which substantially are responsible for the locking in a horizontal direction H. Preferably, the locking parts comprise a protrusion 16 on the bottom side of the tongue 12 and a recess 17 in the lower groove lip 15. The coupling means 10 represented in FIGS. 2 and 3 allow at least a coupling by means of a rotational movement W around the respective edges 2-3-4-5 and/or a coupling by means of a shifting movement S in a substantially horizontal manner of the edges 2-3-4-5 to be coupled towards each other.

FIGS. 4 and 5 represent a variant with a pair of short edges 2-3 which allow obtaining a coupling at least by means of a downward movement D. An edge 2 is provided with a male coupling part 18, whereas the other edge 3 is provided with a female coupling part 19. By means of the downward movement D, the male coupling part 18 is pressed into the female coupling part 19 in order to be locked in the vertical direction V, as a result of a pair of cooperating protrusions 20 and recesses 21. In this case, the recess 21 is partially formed by a resilient element 22 present in the female coupling part 19.

Figure 6:
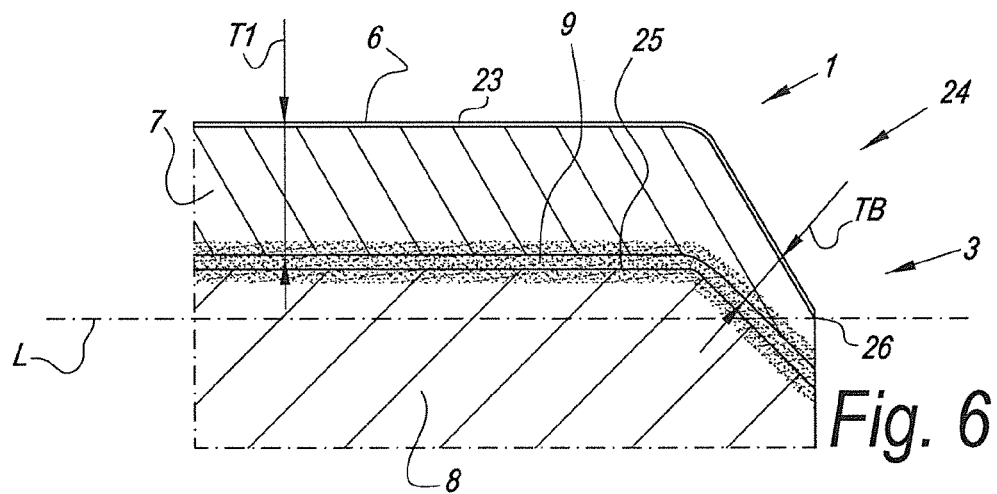
FIG. 6, at a larger scale, shows a view of the area indicated by F6 in FIG. 2.

FIG. 6 represents a detail of the upper edge of the floor panel of FIG. 2. It is clearly shown that the layer of thermosetting resin 9 can penetrate partially into the substrate material 8 and partially into the wood veneer 7 of the top layer.

FIG. 6 further clearly shows that the decorative layer 6 shows transparent or translucent surface material 23 at the surface. In this case, this relates to a material having a matte structure, namely with a gloss degree of 10 or less, as measured according to DIN 67530.

The floor panel of the FIGS. 1 to 8 is provided with lower edge regions on one or more edges 2-3-4-5, wherein the wood veneer 7 extends in one piece from on the surface 25 of the substrate 8 over these lower edge regions 24. In the example, the lower edge regions 24 are realized as a chamfer or bevel. The wood veneer 7 extends over the lower edge region 24 at least up to a point 26, wherein the veneer surface is situated on a level L in a horizontal plane which intersects the aforementioned substrate 8. At the location of the lower edge regions 24, the wood veneer 7 on average has a thickness TB which is smaller than the global thickness T1 of the wood veneer 7. On these edges, the wood veneer 7 is compressed or indented. In the present case, the substrate material 8, too, is indented at the location of these edges. This compressing of the wood veneer 7 leads to an increased resistance against moisture penetration. Preferably, the average thickness TB of the wood veneer on the lower edge regions is less than 85% of the global thickness T1 of the wood veneer.

In the examples, the thermosetting resin 9 extends uninterruptedly underneath the entire wood veneer 7, including the lower edge regions 24.

The surface material 25 follows the relief of the wood veneer 7 at least over the lowered edges 24 or chamfers.

Figure 7:
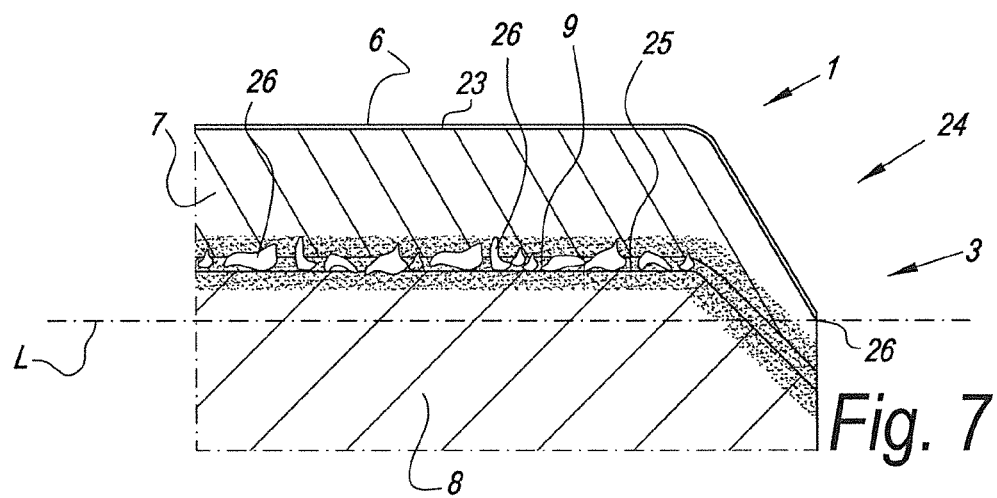
FIGS. 7 and 8, in a view similar to that of FIG. 6, represent variants.

FIG. 7 represents that the thermosetting resin 9 may comprise wear-resistant particles 26, preferably of an average particle size of 20 micrometers or more. These particles penetrate into the wood veneer 7 at the bottom side and provide for a barrier there against the complete wearing through of the veneer 7. Such wear-resistant particles may also be situated in the surface material 25, or only in the surface material 25, however, preferably with a smaller average particle size, for example, of 10 micrometers or less.

Figure 8:
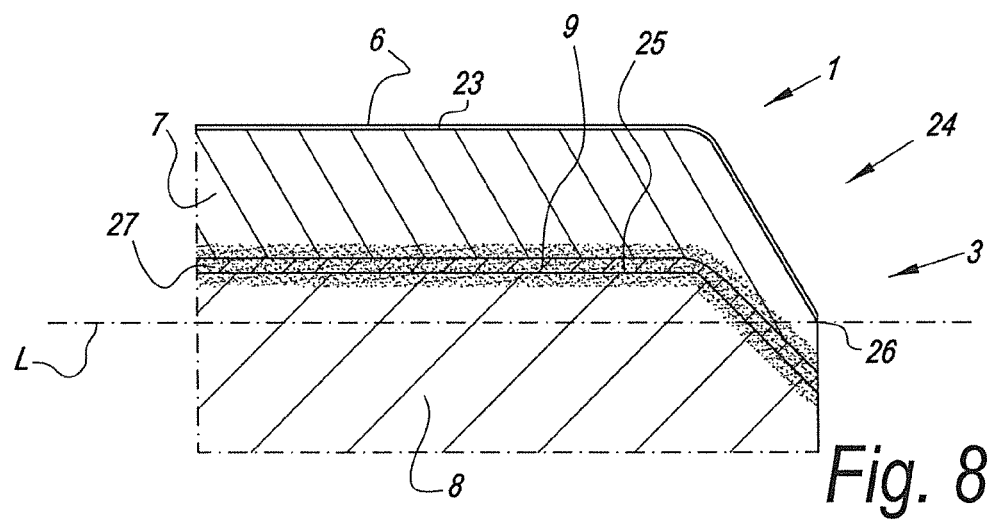

FIG. 8 represents another variant, wherein the thermosetting resin 9 encloses a material sheet, such as a paper sheet 27. Preferably, this relates to a paper sheet 27 having a surface weight between 50 and 150 grams per square meter. Preferably, the thermosetting resin 9 is provided by means of this paper sheet 27, namely in that this paper sheet is impregnated with resin 9, preferably is saturated with resin, and in this manner is placed on the substrate material 8.

FIG. 9 represents a stack 28, which is pressed by means of the method of the second and the third aspect. For the press treatment, a structured press element 29 is applied. The stack 28 comprises a base plate 8A having an average density of more than 750 kilograms per cubic meter, a layer of thermosetting resin 9 and a wood veneer 7 for forming the decorative top layer 6. Further, the stack 28 also comprises a wood veneer for forming the backing layer 11 and a layer of thermosetting resin 9 for attaching this backing layer 11 against the bottom side of the base plate 8a. In the example, the layers with thermosetting resin 9 each time are realized by means of a paper sheet 27 which is impregnated with this resin. The wood veneer 7 comprises a sewing connection 30 which is positioned above a portion 31 of the base plate 8A which has to be removed in following treatments for dividing and for forming coupling means 10, which latter here already are represented in dashed line. In the example, the base plate 8 shows a flat upper surface 25. However, it is not excluded that the upper surface may be pre-formed, entirely or partially, in accordance with the applied press element 29.

FIG. 10 represents the obtained pressed whole 32. Herein, the decorative top layer 6 and the backing layer 11 is represented only schematically as a single layer, namely, without showing the layers with resin 9 and the paper sheets 27. This shows that the veneer 7 and the backing layer 11 are adhered to the base plate 8A by means of the hardened resin 9. Moreover, the base plate 8A is deformed such that the upper surface 25 shows a structure. The wood veneer 7 follows the contour of the structured upper surface 25. Hereby, in this case is obtained that the wood veneer 7 shows a relief of scraped parquet with lowered edges 24.

The present invention is in no way limited to the herein above-described embodiments, on the contrary may such methods and decorative panels be realized according to various variants, without leaving the scope of the present invention.

The invention claimed is:

1. A floor panel with a substrate and a decorative layer of wood veneer provided on the substrate and having a thickness of 1 millimeter or less, wherein said substrate has an average density of more than 750 kilograms per cubic meter;
   wherein this floor panel is rectangular and oblong and comprises a pair of opposite short edges and a pair of opposite long edges;
   wherein said floor panel, on at least said two opposite long edges, is provided with coupling means allowing that two of such floor panels can be coupled to each other in a vertical direction perpendicular to the plane of the coupled panels and in a horizontal direction in this plane and perpendicular to the respective edge;
   wherein said wood veneer and/or said substrate immediately underneath the wood veneer is treated at least at said short edges with a fluoro copolymer;
   wherein a layer of thermosetting resin or a glue layer is located between said substrate and said wood veneer;
   wherein a layer of wear-resistant particles having an average particle size larger than 80 microns is located between said substrate and said wood veneer;
   wherein said wear-resistant particles comprise particles penetrating into said wood veneer at a bottom side thereof.

2. The floor panel of claim 1, wherein said substrate, at the surface where the decorative layer is situated, has a density of more than 900 kilograms per cubic meter.

3. The floor panel of claim 1, wherein said substrate is a wood fiberboard of an HDF type.

4. The floor panel of claim 1, wherein said wood veneer has a thickness between 0.3 and 1 millimeters.

5. The floor panel of claim 1, wherein said decorative layer comprises a transparent or translucent surface material at the surface.

6. The floor panel of claim 5, wherein the transparent or translucent surface material is at least obtained on the basis of a polyurethane-based lacquer.

7. The floor panel of claim 1, wherein said glue layer is a layer of glue on the basis of polyurethane, hot-melt glue, or polyvinyl acetate.

8. The floor panel of claim 1, wherein said floor panel on said two opposite short edges, is provided with coupling means allowing that two of such floor panels can be coupled to each other in a vertical direction perpendicular to the plane of the coupled panels and in a horizontal direction in this plane and perpendicular to the respective edge.

9. The floor panel of claim 1, wherein said wood veneer consists of oak veneer, maple veneer of ash veneer.

10. The floor panel of claim 1, wherein said wood veneer is a sawn wood veneer.

11. The floor panel of claim 10, wherein said wood veneer is free from sewing and/or glue connections.

12. The floor panel of claim 1, wherein the wood veneer is treated at said short edges with the fluoro copolymer.

13. A floor panel with a substrate and a decorative layer of wood veneer provided on the substrate and having a thickness of 1 millimeter or less, wherein said substrate has an average density of more than 750 kilograms per cubic meter;
   wherein this floor panel is rectangular and oblong and comprises a pair of opposite short edges and a pair of opposite long edges;

wherein said floor panel, on at least said two opposite long edges, is provided with coupling means allowing that two of such floor panels can be coupled to each other in a vertical direction perpendicular to the plane of the coupled panels and in a horizontal direction in this plane and perpendicular to the respective edge;

wherein said wood veneer and/or said substrate immediately underneath the wood veneer is treated at least at said short edges with a fluoro copolymer or a polymeric methylene diphenyl diisocyanate;

wherein said wood veneer at said pair of short opposite edges is compressed;

wherein the average thickness of said wood veneer at said pair of short opposite edges is less than 85% of the global thickness of the wood veneer.

14. The floor panel of claim 13, wherein said substrate, at the surface where the decorative layer is situated, has a density of more than 900 kilograms per cubic meter.

15. The floor panel of claim 13, wherein said substrate is a wood fiberboard of an HDF type.

16. The floor panel of claim 13, wherein said wood veneer has a thickness between 0.3 and 1 millimeters.

17. The floor panel of claim 13, wherein said decorative layer comprises a transparent or translucent surface material at the surface.

18. The floor panel of claim 17, wherein the transparent or translucent surface material is at least obtained on the basis of a polyurethane-based lacquer.

19. The floor panel of claim 13, wherein a layer of thermosetting resin or a glue layer is located between said substrate and said wood veneer.

20. The floor panel of claim 19, wherein said glue layer is a layer of glue on the basis of polyurethane, hot-melt glue, or polyvinyl acetate.

21. The floor panel of claim 13, wherein a layer of wear-resistant particles having an average particle size larger than 80 micron is located between said substrate and said wood veneer.

22. The floor panel of claim 21, wherein said wear-resistant particles comprise particles penetrating into said wood veneer at a bottom side thereof.

23. The floor panel of claim 13, wherein said floor panel on said two opposite short edges, is provided with coupling means allowing that two of such floor panels can be coupled to each other in a vertical direction perpendicular to the plane of the coupled panels and in a horizontal direction in this plane and perpendicular to the respective edge.

24. The floor panel of claim 13, wherein said wood veneer consists of oak veneer, maple veneer of ash veneer.

25. The floor panel of claim 13, wherein said wood veneer is a sawn wood veneer.

26. The floor panel of claim 25, wherein said wood veneer is free from sewing and/or glue connections.

27. The floor panel of claim 13, wherein the wood veneer is substantially only treated at said short edges with the fluoro copolymer or the polymeric methylene diphenyl diisocyanate.

* * * * *